Patented Jan. 23, 1934

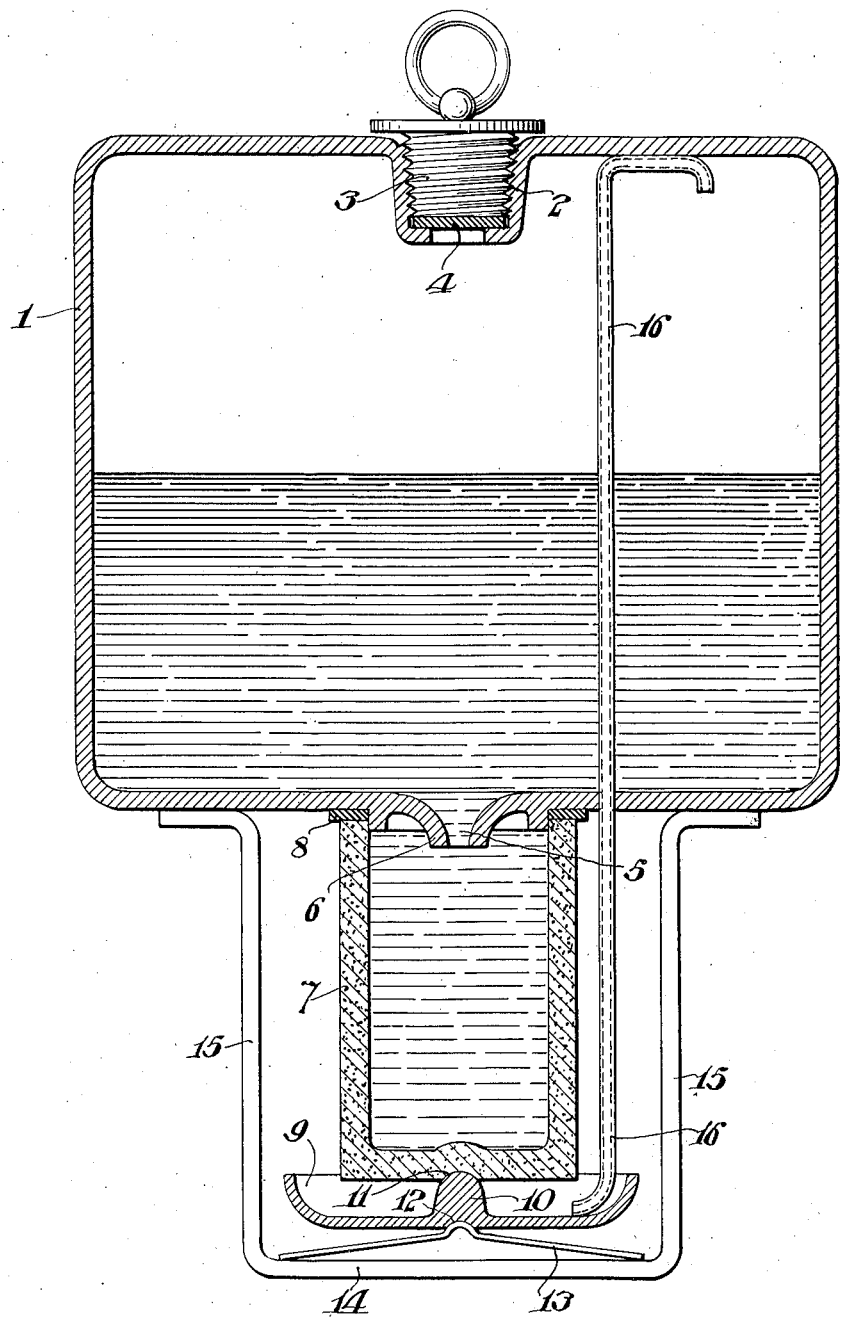

1,944,375

UNITED STATES PATENT OFFICE 1,944,375

HUMIDIFIER

Emil Schneider, Philadelphia, Pa.

Application December 29, 1931
Serial No. 583,635

4 Claims. (Cl. 299—24)

My invention relates to humidifiers, that is to say, to devices for raising the moisture content of the air of a room of a building such as a dwelling or the like.

The principal object of my invention is to provide a humidifier which will be simple and inexpensive in construction, and which will be automatic in its action, requiring no attention other than to see that the water in the reservoir forming part thereof is replenished from time to time.

The nature and characteristic features of my invention will be more readily understood from the following description, taken in connection with the accompanying drawing forming part hereof, illustrating in cross-section a humidifier embodying the main features of my present invention.

It will, of course, be understood that the drawing and description herein contained are illustrative merely, and that various changes and modifications may be made in the structure disclosed without departing from the spirit of the invention.

Referring to the drawing, in the particular embodiment of my invention therein shown, 1 is a tank or reservoir, made of any suitable material and of any desired shape or configuration. The reservoir 1 may be provided with a filling opening 2 at the top, normally closed by a stopper 3 threaded therein.

A sealing gasket 4 may be provided in conjunction with the stopper 3, so that the top of the tank may be made air tight at the filling opening, which is necessary for the proper functioning of the device, as will be hereinafter described. The bottom of the tank is provided with an outlet opening 5, which may be provided with a downwardly extending lip portion 6.

Disposed beneath the tank 1 is an evaporator, preferably comprising a hollow porous cup 7, which may, if desired, be secured directly on the under side of the tank 1, with a sealing washer 8 interposed between the upper edge of the porous cup and the bottom wall of the tank to prevent leakage at that place.

Arranged beneath the porous cup 7 is a drip pan 9, which may be provided with a central teat 10, which may be seated in a complementary recess 11 in the under surface of the bottom of the porous cup.

The drip pan 9 may also be provided with a recess 12 in the under side thereof, for the engagement therein of the central portion of a leaf spring 13. The outer ends of the spring 13 engage the horizontal extension 14 of a bail member 15, the upper ends of the side portions of which may be secured to the tank 1.

A vent pipe 16 extends upwardly from the drip pan 9, through one of the walls of the tank 1, and terminates interiorly of the tank near the top thereof.

The operation of the device may now be explained. The tank or reservoir 1 is filled with water through the opening 2 at the top thereof. The stopper 3 is then replaced to close the top of said tank against the admission of air other than that which is permitted to pass therein through the vent pipe 16, as hereinafter described.

The opening 5 in the bottom of the tank forms a communication between the interior of the tank and the interior of the porous cup, so that the water flows therethrough from the tank to the cup. The water then seeps through the porous walls of the cup, and is evaporated therefrom.

The thickness of the walls and the degree of porosity of the cup are preferably such that no more than the maximum quantity of water which can be evaporated from the outer surface of the cup will be permitted to pass therethrough.

However, in practice conditions arise wherein the water will pass through the walls of the cup faster than it will be evaporated from the outer surface thereof. This will occur, for example, when the humidity of the room in which the device is used has been raised to or near the normal. In such cases, the water will drip downwardly on the outside of the cup and will accumulate in the drip pan.

When a sufficient quantity of water has accumulated in the drip pan to seal the lower end of the vent pipe, and thus prevent the air from passing through said vent pipe to the top of the reservoir, the flow of the water from the tank to the porous cup will be retarded. In this manner, further dripping will be prevented. When, however, the water in the drip pan evaporates sufficiently, air will again be permitted to pass through the vent pipe to the top of the reservoir, and thus relieve the partial vacuum therein.

Should it become necessary, by reason of impurities contained in the water used, to clean the interior of the porous cup 7, the spring 13 may be compressed sufficiently to permit the drip pan 9 and the porous cup 7 to be detached from the device.

The device may be suspended in any desired portion of the room, although for the best results it should be placed, in the case of a room heated by steam or hot water, in proximity to the radiator; and in the case of a room heated by hot air, in front of the register or other outlet of the hot air duct, so that, in any instance, the current of warm air impinging against the evaporator will increase the evaporation and cause the moisture to be distributed throughout the room.

I claim:

1. A humidifier comprising a water reservoir having a closed top and an outlet at the bottom, a closed hollow porous walled evaporator secured to the under side of the reservoir, the outlet of the reservoir being in communication with the interior of said evaporator, a drip pan mounted below the evaporator adapted to catch any excess water which may be fed to the evaporator, and a vent pipe extending from the drip pan to the top of the reservoir, the lower end of said vent pipe being sealed by the accumulation of water in the drip pan.

2. A humidifier comprising a water reservoir having a closed top and an outlet at the bottom, a closed hollow porous walled evaporator detachably secured to the under side of the reservoir, the outlet of the reservoir being in communication with the interior of said evaporator, a drip pan mounted below the evaporator adapted to catch any excess water which may be fed to the evaporator, and a vent pipe extending from the drip pan to the top of the reservoir, the lower end of said vent pipe being sealed by the accumulation of water in the drip pan.

3. A humidifier comprising a water reservoir having a closed top and an outlet at the bottom, a closed hollow porous walled evaporator arranged below the reservoir, the outlet of the reservoir being in communication with the interior of said evaporator, a drip pan mounted below the evaporator adapted to catch any excess water which passes through the wall of the evaporator, and a vent pipe extending from the drip pan to the top of the reservoir, the lower end of said vent pipe being sealed by the accumulation of water in the drip pan.

4. A humidifier comprising a water reservoir, a closed hollow porous walled evaporator arranged below said reservoir, a communication between the bottom of the reservoir and the interior of said evaporator, and means controlled by the drip of excess water from the exposed surface of the evaporator for retarding the flow of water from the reservoir to the evaporator.

EMIL SCHNEIDER.